United States Patent
Yi et al.

(10) Patent No.: US 10,815,403 B2
(45) Date of Patent: Oct. 27, 2020

(54) POLYESTER RESIN COMPOSITION FOR A HOT-MELT ADHESIVE

(71) Applicant: SK CHEMICALS CO., LTD., Seongnam-si, Gyeonggi-do (KR)

(72) Inventors: Dong Hun Yi, Seongnam-si (KR); Soon-Ki Kim, Suwon-si (KR); Hyung-gon Kim, Seongnam-si (KR); Jong-ki Sim, Gunpo-si (KR)

(73) Assignee: SK CHEMICALS CO., LTD., Seongnam-si (KR)

( * ) Notice: Subject to any disclaimer, the term of this patent is extended or adjusted under 35 U.S.C. 154(b) by 11 days.

(21) Appl. No.: 16/192,935

(22) Filed: Nov. 16, 2018

(65) Prior Publication Data

US 2019/0153276 A1    May 23, 2019

(30) Foreign Application Priority Data

Nov. 20, 2017  (KR) .......................... 10-2017-0154692

(51) Int. Cl.
  *C08G 63/66*   (2006.01)
  *C09J 167/02*  (2006.01)
  *C08G 63/672*  (2006.01)

(52) U.S. Cl.
  CPC .......... *C09J 167/025* (2013.01); *C08G 63/66* (2013.01); *C08G 63/672* (2013.01); *C09J 167/02* (2013.01)

(58) Field of Classification Search
  USPC ......................................................... 528/301
  See application file for complete search history.

(56) References Cited

U.S. PATENT DOCUMENTS

| 4,436,896 A | 3/1984 | Okamoto et al. |
| 8,163,843 B2 | 4/2012 | Brenner et al. |
| 2007/0281235 A1* | 12/2007 | Ono .................. C08G 63/20 430/111.4 |

FOREIGN PATENT DOCUMENTS

| KR | 10-2014-0111061 A | 9/2014 |
| WO | 2017/159650 A1 | 9/2017 |

OTHER PUBLICATIONS

European Patent Office; Communication dated Mar. 19, 2019 issued in counterpart European Application No. 18206679.5.

\* cited by examiner

*Primary Examiner* — Terressa Boykin
(74) *Attorney, Agent, or Firm* — Sughrue Mion, PLLC

(57) ABSTRACT

The present invention relates to a polyester resin composition for a hot melt adhesive and a polyester resin produced therefrom. The polyester resin is excellent in adhesiveness to plate substrates, flexibility, and processability.

13 Claims, No Drawings

US 10,815,403 B2

POLYESTER RESIN COMPOSITION FOR A HOT-MELT ADHESIVE

CROSS REFERENCE TO RELATED APPLICATIONS

This application claims priority based on Korean Patent Application No. 10-2017-0154692, filed Nov. 20, 2017.

TECHNICAL FIELD

The present invention relates to a polyester resin composition for a hot melt adhesive and a polyester resin produced therefrom. The polyester resin is excellent in adhesiveness to various substrates, has a high crystallization rate, is excellent in heat resistance, as well as is excellent in hydrolysis resistance, flexibility, and processability.

BACKGROUND ART OF THE INVENTION

A hot melt adhesive is a solid thermoplastic resin at room temperature. A 100% solid thereof is melted into a liquid state by heating it without dissolving or dispersing it in a solvent. A hot melt adhesive was first developed by DuPont in the 1960s based on an ethylene-vinyl acetate (EVA) resin. By virtue of its advantages such as high productivity through process automation, environment-friendly features, wide applicability, and re-adhesion potential, a hot melt adhesive is becoming a popular substitute for conventional solvent-based adhesives. In addition, once a hot melt adhesive is applied to the surface of an adherend in a molten state, it is then cooled and solidified by dissipating heat to the adherend surface and its surroundings.

Conventional hot melt adhesives include ethylene-vinyl acetate-based, polyolefin-based, styrene block copolymer-based, polyamide-based, polyester-based, and urethane-based (reactive hot melts) adhesives based on the base resin used. The base resin greatly affects the adhesiveness and cohesive force, which are the most important physical properties of a hot melt adhesive. A polyester-based hot melt adhesive among the above usually comprises polybutylene terephthalate (PBT), which is a crystalline polymer. It is excellent in heat resistance, has a high crystallization rate, and is excellent in initial adhesiveness. However, a hot melt adhesive composed of PBT has a disadvantage in that a volume shrinkage occurs on the surface of an adherend during the cooling process, resulting in detachment of the adhesive.

Meanwhile, a method of mixing a polyolefin resin and a polycarbonate resin (see Korean Laid-open Patent Publication No. 2014-0111061) or mixing a polyolefin resin and an epoxy resin has been proposed in order to solve the disadvantages of the hot melt adhesive containing PBT as described above. However, the above-mentioned method of mixing two or more kinds of resins has a disadvantage in that the production cost is increased because a mixing step is required in addition to the polymerization step of the resins.

PRIOR ART DOCUMENT

Patent Document (Patent Document 1) Korean Laid-open Patent Publication No. 2014-0111061

DISCLOSURE OF THE INVENTION

Technical Problem to be Solved

Accordingly, the present invention aims to provide a polyester resin for a hot melt adhesive that is excellent in adhesiveness to various substrates, does not require a mixing step of resins, has a high crystallization rate, is excellent in heat resistance, as well as is excellent in hydrolysis resistance, flexibility, and processability.

Solution to the Problem

The present invention provides a polyester resin composition for a hot melt adhesive, which comprises an acid component comprising an aromatic dicarboxylic acid and an aliphatic acid; and an alcohol component comprising an aliphatic dihydric alcohol and a polyether-based polyol, wherein the acid component comprises 50 to 85% by mole of the aromatic dicarboxylic acid and 15 to 50% by mole of the aliphatic acid based on the total moles of the acid component, and the alcohol component comprises 90 to 98% by mole of the aliphatic dihydric alcohol and 2 to 10% by mole of the polyether-based polyol based on the total moles of the alcohol component.

In addition, the present invention provides a polyester resin for a hot melt adhesive prepared by polymerizing the polyester resin composition.

Advantageous Effects of the Invention

The polyester resin for a hot melt adhesive of the present invention is excellent in adhesiveness to plate substrates, flexibility, and processability. Thus, it can be applied to various fields.

DETAILED DESCRIPTION FOR CARRYING OUT THE INVENTION

The present invention provides a polyester resin composition for a hot melt adhesive, which comprises an acid component comprising an aromatic dicarboxylic acid and an aliphatic acid; and an alcohol component comprising an aliphatic dihydric alcohol and a polyether-based polyol, wherein the acid component comprises 50 to 85% by mole of the aromatic dicarboxylic acid and 15 to 50% by mole of the aliphatic acid based on the total moles of the acid component, and the alcohol component comprises 90 to 98% by mole of the aliphatic dihydric alcohol and 2 to 10% by mole of the polyether-based polyol based on the total moles of the alcohol component.

Aromatic Dicarboxylic Acid

The aromatic dicarboxylic acid may comprise at least one selected from the group consisting of terephthalic acid, isophthalic acid, orthophthalic acid, dimethyl terephthalate, dimethyl isophthalate, diethyl terephthalate, diethyl isophthalate, dibutyl terephthalate, dibutyl isophthalate, naphthalene dicarboxylic acid, and acid anhydrides thereof. Specifically, the aromatic dicarboxylic acid may comprise at least one selected from the group consisting of terephthalic acid, isophthalic acid, orthophthalic acid, dimethyl terephthalate, dimethyl isophthalate, and naphthalene dicarboxylic acid. More specifically, the aromatic dicarboxylic acid may comprise terephthalic acid or dimethyl terephthalate, and isophthalic acid or dimethyl isophthalate.

If the resin composition comprises terephthalic acid or dimethyl terephthalate, the melting point of a polyester resin thus produced is appropriately controlled and the chemical resistance thereof is improved. In addition, if the resin composition comprises isophthalic acid or dimethyl isophthalate, the polybutylene terephthalate structure formed from terephthalic acid or dimethyl terephthalate and 1,4-butanediol is destroyed, thereby reducing the volume shrinkage that occurs on the surface of an adhered at the time of adhesion.

The acid component may comprise 50 to 85% by mole, or 60 to 85% by mole, of the aromatic dicarboxylic acid based on the total number of moles of the acid component. Specifically, the acid component may comprise 30 to 60% by mole of terephthalic acid or dimethyl terephthalate and 15 to 50% by mole of isophthalic acid or dimethyl isophthalate based on the total number of moles of the acid component. More specifically, the acid component may comprise 35 to 60% by mole of dimethyl terephthalate and 15 to 45% by mole of isophthalic acid based on the total number of moles of the acid component. If the aromatic dicarboxylic acid is comprised within the above content range, it is possible to prevent the problems that the heat resistance is lowered and the solidification time of the adhesive is prolonged and that the kind of an adherend is limited due to the high melting point.

Aliphatic Acid

If the resin composition comprises an aliphatic acid, it is possible to prevent the problem that the crystallization rate of a polyester resin thus produced is excessively lowered and to produce an effect of lowering the glass transition temperature.

The aliphatic acid may be an aliphatic carboxylic acid having 6 to 12 carbon atoms. Specifically, the aliphatic acid may comprise at least one selected from the group consisting of adipic acid, sebacic acid, azelaic acid, and dodecanoic acid. More specifically, the aliphatic acid may comprise at least one selected from the group consisting of adipic acid, sebacic acid, and azelaic acid. Even more specifically, the aliphatic acid may comprise adipic acid or sebacic acid.

The acid component may comprise 15 to 45% by mole, or 15 to 40% by mole, of the aliphatic acid based on the total number of moles of the acid component.

Specifically, the acid component may comprise 15 to 50% by mole of adipic acid, sebacic acid, or a combination thereof.

Aliphatic Dihydric Alcohol

The aliphatic dihydric alcohol reacts with an aromatic dicarboxylic acid to form a basic crystal structure of a polyester resin.

The aliphatic dihydric alcohol may comprise at least one selected from the group consisting of ethylene glycol, 1,2-propanediol, 1,3-propanediol, 1,2-butanediol, 1,4-butanediol, 1,5-pentanediol, and 1,6-hexanediol. Specifically, the aliphatic dihydric alcohol may comprise at least one selected from the group consisting of ethylene glycol, 1,2-propanediol, 1,4-butanediol, and 1,6-hexanediol. More specifically, the aliphatic dihydric alcohol may comprise at least one selected from the group consisting of ethylene glycol, 1,4-butanediol, and 1,6-hexanediol. Even more specifically, the aliphatic dihydric alcohol may comprise at least one selected from the group consisting of ethylene glycol and 1,4-butanediol.

The alcohol component may comprise 90 to 98% by mole, or 93 to 97% by mole, of the aliphatic dihydric alcohol based on the total number of moles of the alcohol component. If the aliphatic dihydric alcohol is comprised within the above molar amount range, the effect obtained relative to the used amount of the aliphatic dihydric alcohol is appropriate and is thus economical, and it produces an effect of improving the heat resistance.

Polyether-Based Polyol

The polyether-based polyol forms a block copolymer with a polyester polymerized from an aromatic dicarboxylic acid or an aliphatic acid and an aliphatic dihydric alcohol, to thereby prevent the volume shrinkage that occurs on the surface of an adhered at the time of adhesion. In addition, the polyether-based polyol introduces an ether functional group into a polyester resin thus produced to impart polarity, which enhances the adhesiveness thereof by increasing the interaction with an adherend. Further, the polyether-based polyol serves as a soft segment in a polyester resin thus produced, thereby lowering the glass transition temperature of the resin and increasing the flexibility thereof.

The polyether-based polyol may comprise at least one selected from the group consisting of polyethylene glycol, polytetramethylene glycol, polypropylene glycol, a copolymer of tetramethylene glycol and propylene glycol, and a copolymer of tetramethylene glycol and neopentyl glycol. Specifically, the polyether-based polyol may comprise polyethylene glycol, polytetramethylene glycol, or a combination thereof. More specifically, the polyether-based polyol may comprise polyethylene glycol and polytetramethylene glycol.

If the resin composition comprises polyethylene glycol, the number of ether functional groups per unit molecular weight is increased, thereby improving the adhesiveness of the resin. In addition, if the resin composition comprises polytetramethylene glycol, the water resistance of a resin thus produced is improved.

The polyether-based polyol may have a number average molecular weight of 500 to 5,000 g/mole. Specifically, the polyether-based polyol may have a number average molecular weight of 650 to 3,000 g/mole or 1,000 to 2,000 g/mole. If the number average molecular weight of the polyether-based polyol is within the above range, it is possible to prevent the problem that such physical properties of the resin as flexibility, mechanical properties, and adhesiveness fail to meet the target physical properties.

The alcohol component may comprise 2 to 10% by mole, or 3 to 7% by mole, of the polyether-based polyol based on the total number of moles of the alcohol component. Specifically, the alcohol component may comprise 1 to 5% by mole, or 1 to 3.5% by mole, of polyethylene glycol and 1 to 5% by mole, or 2 to 4% by mole, of polytetramethylene glycol based on the total number of moles of the alcohol component.

The resin composition may comprise terephthalic acid or dimethyl terephthalate, and isophthalic acid or dimethyl isophthalate, as the aromatic dicarboxylic acid, adipic acid or sebacic acid as the aliphatic acid, 1,4-butanediol as the aliphatic dihydric alcohol, and polyethylene glycol and polytetramethylene glycol as the polyether-based polyol.

Specifically, the resin composition may comprise terephthalic acid or dimethyl terephthalate, isophthalic acid or dimethyl isophthalate, adipic acid, 1,4-butanediol, polyethylene glycol, and polytetramethylene glycol. In addition, the resin composition may comprise terephthalic acid or dimethyl terephthalate, isophthalic acid or dimethyl isophthalate, sebacic acid, 1,4-butanediol, polyethylene glycol, and polytetramethylene glycol.

In addition, the resin composition may further comprise ethylene glycol. That is, the resin composition may comprise 1,4-butanediol and ethylene glycol as the aliphatic dihydric alcohol. Specifically, the resin composition may comprise terephthalic acid or dimethyl terephthalate, isophthalic acid or dimethyl isophthalate, adipic acid, 1,4-butanediol, ethylene glycol, polyethylene glycol, and polytetramethylene glycol. In addition, the resin composition may comprise terephthalic acid or dimethyl terephthalate, isophthalic acid or dimethyl isophthalate, sebacic acid, 1,4-butanediol, ethylene glycol, polyethylene glycol, and polytetramethylene glycol.

Additive

The resin composition may further comprise at least one additive selected from the group consisting of a reaction catalyst and a stabilizer.

The reaction catalyst may comprise at least one selected from the group consisting of titanium-based, germanium-based, and zinc-based catalysts.

The stabilizer may comprise at least one selected from the group consisting of phosphoric acid, phosphorous acid, and salts or ester compounds thereof.

Polyester Resin for a Hot Melt Adhesive

The present invention provides a polyester resin for a hot melt adhesive prepared by polymerizing the polyester resin composition as described above.

The polyester resin may have a weight average molecular weight of 20,000 to 300,000 g/mole. Specifically, the polyester resin may have a weight average molecular weight of 40,000 to 200,000 g/mole or 60,000 to 120,000 g/mole.

In addition, the polyester resin may have a number average molecular weight of 10,000 to 100,000 g/mole. Specifically, the polyester resin may have a number average molecular weight of 10,000 to 80,000 g/mole or 10,000 to 40,000 g/mole.

If the weight average molecular weight or the number average molecular weight of the polyester resin is within the above range, it is possible to prevent the problems that the water resistance and chemical resistance of the resin are lowered and that the wettability to an adherend is deteriorated.

The polyester resin may have a glass transition temperature (Tg) of 0° C. or lower. Specifically, the polyester resin may have a glass transition temperature (Tg) of −60 to −20° C. or −60 to −30° C. If the glass transition temperature of the polyester resin is within the above range, the flexibility and workability of the resin are improved.

In addition, the polyester resin may have a melting temperature (Tm) of 80 to 150° C. The polyester resin may have a melting temperature (Tm) of 90 to 130° C. or 95 to 120° C. If the melting temperature of the polyester resin is within the above range, it is possible to prevent the problems that it takes a long time to melt the adhesive and that the kind of an adherend is limited.

The polyester resin may have an adhesiveness of 0.7 to 2.0 kgf/cm when measured after it is coated onto a polyethylene terephthalate film in a size of 241 mm×25 mm×20 μm (width×length× thickness) and the coating layer is allowed to stand at room temperature for 2 weeks. Specifically, the adhesiveness may be 0.9 to 1.8 kgf/cm or 1.0 to 1.7 kgf/cm when measured after the coating layer is allowed to stand at room temperature for 2 weeks.

The coating layer may have a rate of change in the adhesiveness of −10 to 20% as calculated by the following Equation 1. Specifically, the coating layer may have a rate of change in the adhesiveness of −9.5 to 20%, −9.5 to 18%, or −9.5 to 15%, as calculated by the following Equation 1.

Rate of change in adhesiveness={(adhesiveness after 2 weeks−initial adhesiveness)/initial adhesiveness}×100   [Equation 1]

The polyester resin may be used as an adhesive on at least one substrate selected from the group consisting of a polyethylene terephthalate film, a polyvinyl chloride film, a metal plate, and paper.

EXAMPLE

Hereinafter, the present invention will be described in detail with reference to examples. However, these examples are provided only for illustration purposes, and the present invention is not limited thereto.

Example 1

Preparation of a Resin Composition

An apparatus for polymerizing 5 kg of a polyester with a stirrer and capable of applying a high vacuum was charged with 100 parts by weight of dimethyl terephthalate (DMT), 43 parts by weight of isophthalic acid, 38 parts by weight of adipic acid, 122 parts by weight of 1,4-butanediol, 10 parts by weight of ethylene glycol, 40 parts by weight of polytetramethylene glycol (number average molecular weight: 1,000 g/mole), and 40 parts by weight of polyethylene glycol (number average molecular weight: 1,000 g/mole). Added thereto was 0.2 part by weight of tetrabutoxy titanium as a condensation polymerization catalyst.

Then, the esterification reaction was carried out by gradually raising the temperature from room temperature to 220° C. In such event, when methanol and water as byproducts were discharged at the theoretical flow rates, a vacuum was gradually applied, so that the pressure inside the reactor became 1 torr, while the reactants in the oligomeric state were kept not to be scattered, and the reaction was carried out for 2 hours while the temperature was maintained at 250° C., to thereby prepare a polyester resin. The polyester resin thus obtained had an intrinsic viscosity (IV) of 1.0 dl/g when measured at 35° C. using a Cannon-UbbeLodhe type viscometer and a glass transition temperature of −30° C. and a melting temperature (Tm) of 96° C. when measured using a differential scanning calorimeter (Tg).

Examples 2 and 3 and Comparative Examples 1 to 4

Polyester resins were prepared in the same manner as in Example 1, except that the types and contents of the acid component and the alcohol component were changed as shown in Table 1 below.

Test Example: Evaluation of the Physical Properties

The polyesters of Examples 1 to 3 and Comparative Examples 1 to 4 were each evaluated for their physical properties by the following methods.

(1) Glass Ransition Temperature (Tg) and Melting Temperature (Tm)

They were measured using a differential scanning calorimeter.

(2) Intrinsic Viscosity (IV)

It was measured at 35° C. using a Cannon-UbbeLodhe type viscometer with an ortho-chlorophenol solvent.

(3) Number Average Molecular Weight and Weight Average Molecular Weight

Gel permeation chromatography (product of WATERS GPC 150-CV) was used. The polyester resins of Examples 1 to 3 and Comparative Examples 1 to 4 was each dissolved in tetrahydrofuran (THF), and the number average molecular weight or weight average molecular weight was measured with reference to the polystyrene standard (Shodex SM-105' from Showa Denko, Japan).

(4) Water Resistance 10 g of the polyester resin thus prepared was heated to the melting point and melted, and it was then crystallized in water. The weight of the initial resin and the weight of the resin after the crystallization were measured. Then, the rate of weight increase was calculated by the following Equation 2. When the rate of weight increase was less than 0.7%, it was evaluated as ⊚. When the rate of weight increase was 0.7 to 1%, it was evaluated as o. When the rate of weight increase exceeded 1%, it was evaluated as X.

Rate of weight increase={(weight of resin after crystallization−initial weight of resin)/initial weight of resin}×100   [Equation 2]

(5) Adhesiveness

The polyester resin was dissolved in dichloromethane (DCM) in an amount of 20% (w/v), which was then roll-coated in a size of 241 mm×25 mm×20 μm (width× length× thickness) onto a PET film having a thickness of 188 μm to form a coating layer. Thereafter, it was dried in a hot air oven at 100° C. for 1 minute and then laminated at 150° C. with a dry laminator to prepare a sheet. The initial adhesiveness was then measured using a universal tensile tester. Thereafter, the sheet was allowed to stand at room temperature for 2 weeks, and the adhesiveness was then measured in the same manner as described above. The rate of change in the adhesiveness (%) was calculated by the following Equation 1 using the initial adhesiveness and the adhesiveness after 2 weeks.

Rate of change in adhesiveness={(adhesiveness after 2 weeks−initial adhesiveness)/initial adhesiveness}×100   [Equation 1]

acid and polyethylene glycol, and Comparative Example 4, which did not contain polytetramethylene glycol and polyethylene glycol, were poor in long-term adhesiveness.

The invention claimed is:

1. A polyester resin composition for a hot melt adhesive, which comprises an acid component comprising an aromatic dicarboxylic acid and an aliphatic acid; and an alcohol component comprising an aliphatic dihydric alcohol and a polyether-based polyol,
   wherein the acid component comprises 50 to 85% by mole of the aromatic dicarboxylic acid and 15 to 50% by mole of the aliphatic acid based on the total number of moles of the acid component,
   the alcohol component comprises 90 to 98% by mole of the aliphatic dihydric alcohol and 2 to 10% by mole of the polyether-based polyol based on the total number of moles of the alcohol component, and
   the polyether-based polyol comprises 1 to 5% by mole of polyethylene glycol and 1 to 5% by mole of polytetramethylene glycol based on the total number of moles of the alcohol component.

2. The polyester resin composition for a hot melt adhesive of claim 1,
   wherein the aromatic dicarboxylic acid comprises one or more selected from the group consisting of terephthalic acid, isophthalic acid, orthophthalic acid, dimethyl terephthalate, dimethyl isophthalate, diethyl terephthalate, diethyl isophthalate, dibutyl terephthalate, dibutyl isophthalate, naphthalene dicarboxylic acid, and acid anhydride thereof.

3. The polyester resin composition for a hot melt adhesive of claim 2,
   wherein the acid component comprises 30 to 60% by mole of terephthalic acid or dimethyl terephthalate and

TABLE 1

| Composition (wt. %) | | Ex. 1 | Ex. 2 | Ex. 3 | C. Ex. 1 | C. Ex. 2 | C. Ex. 3 | C. Ex. 4 |
|---|---|---|---|---|---|---|---|---|
| Acid component | Terephthalic acid | 100 | 100 | 100 | 100 | 100 | 100 | 100 |
| | Isophthalic acid | 43 | 29 | 34 | 51 | 57 | 57 | 54 |
| | Adipic acid | 38 | 25 | — | 30 | — | — | 41 |
| | Sebacic acid | — | — | 62 | — | — | — | — |
| Alcohol component | 1,4-butanediol | 122 | 101 | 135 | 107 | 114 | 114 | 156 |
| | Ethylene glycol | 10 | 8 | — | 11 | — | — | — |
| | Polytetramethylene glycol | 40 | 48 | 48 | — | 67 | — | — |
| | Polyethylene glycol | 40 | 21 | 48 | 87 | — | 67 | — |
| Polyester resin | Tm (° C.) | 96 | 110 | 102 | 96 | 136 | 136 | 116 |
| | Tg (° C.) | −30 | −33 | −50 | −30 | −13 | −13 | −1 |
| | Number average molecular weight (g/mole) | 22,000 | 22,000 | 22,000 | 20,000 | 20,000 | 20,000 | 19,000 |
| | Weight average molecular weight (g/mole) | 80,000 | 80,000 | 80,000 | 70,000 | 70,000 | 70,000 | 65,000 |
| | Water resistance | ○ | ⊚ | ○ | X | ○ | X | ⊚ |
| Adhesiveness | Initial (kgf/cm) | 1.4 | 1.2 | 1.1 | 1.3 | 1.1 | 1.2 | 1.0 |
| | After 2 weeks (kgf/cm) | 1.6 | 1.1 | 1.0 | 1.5 | 0.5 | 1.0 | 0.1 |
| | Rate of change (%) | 14.28 | −8.33 | −9.09 | 15.38 | −54.54 | −16.66 | −90 |

As shown in Table 1, the coating layers prepared from the polyester resins of Examples 1 to 3 were excellent in water resistance and long-term adhesiveness.

In contrast, those of Comparative Example 1, which did not contain polytetramethylene glycol, and Comparative Example 3, which did not contain polytetramethylene glycol, were poor in water resistance. In addition, those of Comparative Example 2, which did not contain an aliphatic 15 to 50% by mole of isophthalic acid or dimethyl isophthalate based on the total number of moles of the acid component.

4. The polyester resin composition for a hot melt adhesive of claim 1,
   wherein the aliphatic acid is an aliphatic carboxylic acid having 6 to 12 carbon atoms.

5. The polyester resin composition for a hot melt adhesive of claim 4,
wherein the aliphatic acid comprises one or more selected from the group consisting of adipic acid, sebacic acid, azelaic acid, and dodecanoic acid.

6. The polyester resin composition for a hot melt adhesive of claim 1,
wherein the polyether-based polyol comprises one or more selected from the group consisting of polyethylene glycol, polytetramethylene glycol, polypropylene glycol, a copolymer of tetramethylene glycol and propylene glycol, and a copolymer of tetramethylene glycol and neopentyl glycol.

7. The polyester resin composition for a hot melt adhesive of claim 1,
wherein the polyether-based polyol has a number average molecular weight of 500 to 5,000 g/mole.

8. The polyester resin composition for a hot melt adhesive of claim 1,
wherein the aliphatic dihydric alcohol comprises at least one selected from the group consisting of ethylene glycol, 1,2-propanediol, 1,3-propanediol, 1,2-butanediol, 1,4-butanediol, 1,5-pentanediol, and 1,6-hexanediol.

9. A polyester resin for a hot melt adhesive prepared by polymerizing the polyester resin composition of claim 1.

10. The polyester resin for a hot melt adhesive of claim 9, which has a weight average molecular weight of 20,000 to 30,000 g/mole and a glass transition temperature (Tg) of −60 to −30° C.

11. The polyester resin for a hot melt adhesive of claim 9, which has a melting temperature (Tm) of 80 to 150° C.

12. The polyester resin for a hot melt adhesive of claim 9, which has an adhesiveness of 0.7 to 2.0 kgf/cm, said adhesiveness being measured after the polyester resin is coated onto a polyethylene terephthalate film to have a size of 241 mm×25 mm×20 μm (width× length× thickness) and the polyester resin coating is allowed to stand at room temperature for 2 weeks.

13. The polyester resin for a hot melt adhesive of claim 12,
wherein the polyester resin coating has a rate of change in the adhesiveness of −10 to 20% as calculated by the following Equation 1:
Rate of change in adhesiveness={(adhesiveness after 2 weeks− initial adhesiveness)/initial adhesiveness}× 100.

* * * * *